US009374228B2

(12) United States Patent
Pendarakis et al.

(10) Patent No.: US 9,374,228 B2
(45) Date of Patent: Jun. 21, 2016

(54) VERIFYING A GEOGRAPHIC LOCATION OF A VIRTUAL DISK IMAGE EXECUTING AT A DATA CENTER SERVER WITHIN A DATA CENTER

(71) Applicant: International Business Machines Corporation, Armonk, NY (US)

(72) Inventors: Dimitrios Pendarakis, Westport, CT (US); Arvind Seshadri, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 13/651,380

(22) Filed: Oct. 12, 2012

(65) Prior Publication Data
US 2014/0108784 A1    Apr. 17, 2014

(51) Int. Cl.
*H04L 29/06* (2006.01)
*H04L 9/32* (2006.01)
*H04L 9/08* (2006.01)

(52) U.S. Cl.
CPC ............ *H04L 9/3263* (2013.01); *H04L 63/062* (2013.01); *H04L 9/0872* (2013.01); *H04L 9/0877* (2013.01); *H04L 9/3281* (2013.01); *H04L 63/0442* (2013.01); *H04L 63/0492* (2013.01); *H04L 63/0823* (2013.01); *H04L 2209/127* (2013.01)

(58) Field of Classification Search
CPC . H04L 9/0872; H04L 9/0877; H04L 63/0823; H04L 63/0442; H04L 9/3281
USPC .......................................... 713/156, 168, 176
See application file for complete search history.

(56) References Cited

U.S. PATENT DOCUMENTS

| 6,601,097 | B1 | 7/2003 | Cheston et al. ............... 709/222 |
| 2002/0032787 | A1 | 3/2002 | Overton ......................... 709/230 |
| 2003/0046339 | A1 | 3/2003 | Ip ................................... 709/203 |
| 2005/0097097 | A1* | 5/2005 | Hunt et al. ........................ 707/3 |

(Continued)

FOREIGN PATENT DOCUMENTS

| TW | 201220189 (A) | 5/2012 | ............. G06F 17/00 |
| TW | 201234904 (A) | 8/2012 | ............ H04W 12/06 |
| WO | WO 2012039714 | 3/2012 | ............. G06F 15/16 |

OTHER PUBLICATIONS http://www.computer.org/portal/web/csdl/doi/10.1109/MSP.2009. 87 ("Data Security in the World of Cloud Computing") printed Oct. 12, 2012.

(Continued)

*Primary Examiner* — Aravind Moorthy
(74) *Attorney, Agent, or Firm* — Ido Tuchman; Mercedes L. Hobson

(57) ABSTRACT

A method to verify a geographic location of a virtual disk image executing at a data center server within a data center. One embodiment includes a cryptoprocessor proximate the data center server, a hypervisor configured to send a disk image hash value of the virtual disk image, a digital certificate issued to the cryptoprocessor, an endorsement key to a data center tenant and a location provider. The method includes sending a disk image hash value of the virtual disk image, an endorsement key unique to a cryptoprocessor proximate the data center server to a data center tenant, and a digital certificate to a data center tenant. Next, the location provider sends the geographic location of the cryptoprocessor matching the endorsement key to the data center tenant.

12 Claims, 3 Drawing Sheets

(56) References Cited

U.S. PATENT DOCUMENTS

| | | | |
|---|---|---|---|
| 2005/0131825 A1 | 6/2005 | Vijay | 705/44 |
| 2005/0149733 A1 | 7/2005 | Catherman | 713/175 |
| 2006/0023671 A1 | 2/2006 | Cheston et al. | 370/338 |
| 2006/0091207 A1* | 5/2006 | Chang | 235/385 |
| 2006/0244596 A1* | 11/2006 | Larson et al. | 340/572.1 |
| 2008/0209005 A1 | 8/2008 | Akamatsu et al. | 709/217 |
| 2008/0235266 A1* | 9/2008 | Huang et al. | 707/102 |
| 2009/0109031 A1* | 4/2009 | Calvin et al. | 340/572.1 |
| 2009/0237210 A1 | 9/2009 | Ciesla | 340/10.1 |
| 2009/0282140 A1 | 11/2009 | White et al. | 709/223 |
| 2010/0161998 A1* | 6/2010 | Chen et al. | 713/189 |
| 2012/0078946 A1 | 3/2012 | Darcy | 707/769 |
| 2013/0159723 A1* | 6/2013 | Brandt et al. | 713/176 |
| 2013/0185812 A1* | 7/2013 | Lie | G06F 9/45558 726/29 |

OTHER PUBLICATIONS http://www.educause.edu/Resources/WhereisthecloudGeographyeconom/171382 ("Where Is the Cloud? Geography, Economics, Environment, and Jurisdiction in Cloud Computing") printed Oct. 12, 2012.

* cited by examiner

VERIFYING A GEOGRAPHIC LOCATION OF A VIRTUAL DISK IMAGE EXECUTING AT A DATA CENTER SERVER WITHIN A DATA CENTER

BACKGROUND

This invention relates to verifying the geographic location of an executing virtual disk image or workload, and more particularly to verifying the geographical location of an executing workload on a server in a cloud computing environment.

In several cases, it is desirable for a customer to verify the exact physical location where their workload executes. This may be because of regulatory requirements, for example certain data may only be processed by applications executing within certain jurisdictions (countries, states, etc.), or because of the need to verify that workloads are executing in data centers that satisfy compliance standards, including those for physical security. If workloads migrate outside such geographical locations or compliant data centers, weak physical security or IT security could lead to compromise and/or data loss.

Prior work in the area of determining the geographical location of a server is based on one of four approaches:

1. Using the server's IP address: Each geographical area in the world is assigned a unique block of IP addresses to enable hierarchical routing tables to be used for efficiency purposes. Hence, it is possible to use the IP address of a server to determine its approximate geographical location. Such services are available for general use on the Internet (e.g. services advertised by http://www.ipaddresslocation.org/).

2. Using measurements of delay times for example through traceroute or ping commands: It possible to determine the geographical location of a server by measuring the traceroute or ping times to that server from multiple hosts on the Internet with known geographical locations.

3. Using radio receiver embedded in server: A server may be able to determine its geographical location if is equipped with a radio receiver that can receive signals from radio beacons with known geographical locations, or from cell phone towers or GPS satellites. The server can then communicate its geographical location to the client.

4. Direct human observation: Upon receiving a request to identify its physical location, the server generates a human perceivable signal that enables the cloud provider to locate the server. The cloud provider then provides this location information to the client.

All of the above techniques assume that the operator or administrator of the server whose location is to be determined is trusted to not subvert the operation of the technique being used.

BRIEF SUMMARY

Accordingly, one example aspect of the present invention is a method to verify a geographic location of a virtual disk image executing at a data center server within a data center. The method includes sending a disk image hash value of the virtual disk image signed by an endorsement key, the public half of the endorsement key, and a digital certificate certifying the public half of the endorsement key to a data center tenant. The private half of the endorsement key is stored in a cryptoprocessor proximate the data center server and is unique to the cryptoprocessor. Furthermore, the digital certificate is issued to the cryptoprocessor. Next, a location provider sends the geographic location of the cryptoprocessor matching the public half of the endorsement key to the data center tenant.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
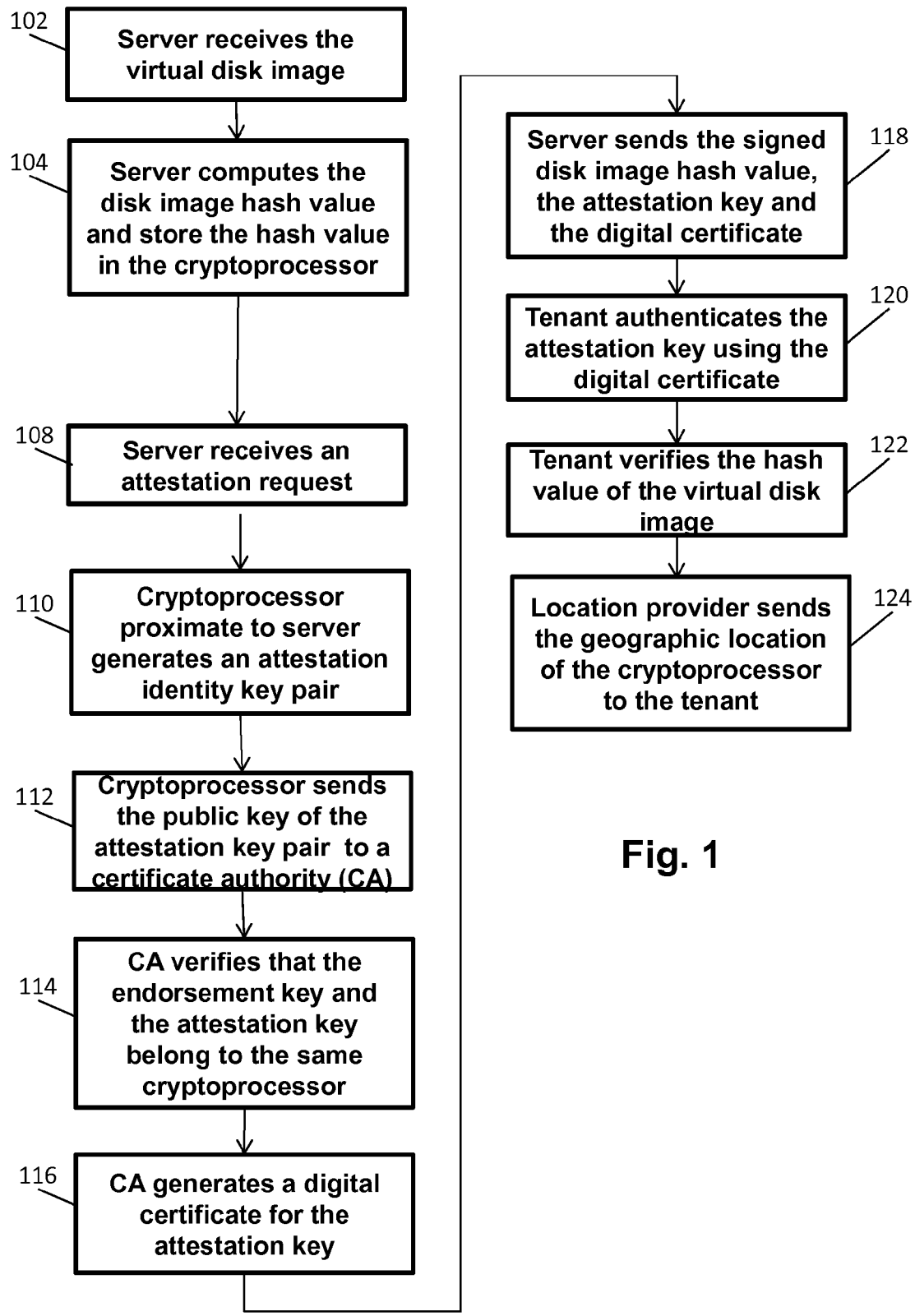
FIG. 1 shows a method to verify a geographic location of a virtual disk image executing at a data center server within a data center according to one embodiment of the present invention.

The present invention is described with reference to embodiments of the invention. Throughout the description of the invention reference is made to FIGS. 1-3. When referring to the figures, like structures and elements shown throughout are indicated with like reference numerals.

FIG. 1 shows a method to verify a geographic location of a virtual disk image (also referred to herein as a workload) executing at a data center server within a data center in accordance with one embodiment of the present invention. The method includes a receiving step 102. During receiving step 102, the data center receives the virtual disk image from a data center tenant for execution at the data center. After receiving step 102 is completed, the method continues to computing step 104.

At computing step 104, the disk image hash value is computed by the hypervisor executing at the data center server. In one embodiment, the disk image hash value is a SHA-1 hash, and is computed at the time of workload deployment on the assigned server. Furthermore, the SHA-1 hash may be computed by a cryptoprocessor or the server. As used herein, a cryptoprocessor is a tamper resistant, dedicated computer on a chip or microprocessor for carrying out cryptographic operations. In a particular embodiment, the cryptoprocessor includes a central processing unit (CPU) and a trusted platform module (TPM) (also referred to herein as a cryptoprocessor). In addition, the cryptoprocessor is located proximate to the data center server and contains an endorsement key (EK) unique to a cryptoprocessor.

Once computed, the hash may be transmitted and stored in one of the platform configuration registers (PCR) of the TPM. The PCR provides tamperproof storage location for the workload hash value. Furthermore, the tenant can obtain the IP address or hostname of the server on which its workload is deployed from the cloud provider. After computing step 104 is completed, the method continues to receiving step 108.

At receiving step 108, an attestation request is received by the server from the tenant. In one embodiment, the hypervisor sends a command to the TPM requesting that the TPM return the hash of the tenant's workload. For example, the hypervisor may send a TPM_Quote command to the TPM, requesting that the TPM return the contents of PCR that holds of hash of the tenant's workload. After receiving step 108 is completed, the method continues to generating step 110.

At generating step 110, the TPM generates an attestation identity key pair. After generating step 110, the method continues to sending step 112.

At sending step 112, the TPM sends the public key portion of the attestation identity key pair to a certificate authority via the hypervisor. In one embodiment, the TPM creates a new attestation identity key (AIK) pair, and sends the public part of the AIK, signed with its EK, to a certificate authority (the Privacy CA), via the hypervisor. The request may contain, among other things, the public half of the TPM's EK, the public half of the newly generated AIK and the signature of the AIK. The hypervisor caches the public half of the TPM's EK from the certification request. After sending step 112, the method continues to verifying step 114.

At verifying step 114, the public portion of the attestation identity key pair is authenticated by the certificate authority. In a particular embodiment, a Privacy CA verifies that the EK in the certification request belongs to a genuine TPM. For example, each TPM may generate its EK pair when it is manufactured, and the manufacturer sends the public portion of each TPM's EK to the Privacy CA. The Privacy CA may, for example, maintain a database of valid EKs. After verifying step 114, the method continues to generating step 116.

At generating step 116, the certificate authority generates a digital certificate for the attestation identity key pair. This occurs once the authenticity of the public portion of the attestation identity key is verified. In one embodiment, upon successful verification, the Privacy CA signs the public half of the TPM's AIK, and generates a certificate for the AIK. After generating step 116, the method continues to sending step 118.

At sending step 118, the disk image hash value of the virtual disk image, the endorsement key, and the digital certificate are sent to the data center tenant. In one embodiment, the TPM receives the certificate for the newly generated AIK from the Privacy CA. The TPM then signs hash value of the tenant workload using the newly certified AIK. The TPM then sends the hash value together with its signature, the public half of the AIK used to generate the signature, and the Privacy CA certificate for the AIK to the hypervisor, as a response to the TPM_Quote command. Furthermore, the hypervisor sends the result of the TPM_Quote command to the tenant the along with EK of the TPM in response to the received attestation request.

In one embodiment, the disk image hash value is signed using the attestation identity key. Additionally, the public key of the attestation identity key pair and the digital certificate for the identity key pair may be sent to the data center tenant. The disk image hash value may be signed by a public key of an attestation identity key pair. Furthermore, the digital certificate is issued to the cryptoprocessor. After sending step 118, the method proceeds to comparing step 120.

At comparing step 120, the data center tenant compares the public portion of the attestation identity key pair to the contents of the digital certificate. For example, the tenant may verify the authenticity of the AIK it receives in the attestation response using the Privacy CA certificate for the AIK. After comparing step 120, the method proceeds to verifying step 122.

At verifying step 122, the certificate authority verifies that the endorsement key and the public portion of the attestation identity key pair belong to the same cryptoprocessor. In one embodiment, the tenant queries the Privacy CA to check if the EK and the AIK it receives come from the same TPM. The tenant may verify the authenticity of the hash value of its workload using the AIK. At this stage the tenant knows that its workload is executing on a server whose TPM has the EK it received. Next, the tenant needs to verify the geographic location of the TPM with that EK. After verifying step 122, the method continues to sending step 124.

At sending step 124, the location provider sends the geographic location of the cryptoprocessor matching the endorsement key to the data center tenant. Furthermore, determining the geographic location of the cryptoprocessor may include reading a radio-frequency identification (RFID) tag by the location provider. In one embodiment, the tenant sends a request containing the endorsement key to all the RFID readers in the cloud, asking for the geographical location of the TPM. Each RFID reader scans its datacenter with its electronically steerable antenna, reading the EKs of all the TPMs in the datacenter. The RFID reader which receives the EK in the tenant request during its scan sends its geographical location to the tenant. Also, the RFID chip containing the EK is assumed to be tamper resistant. In one embodiment, it may be carried by a cryptoprocessor. Additionally, the RFID reader may not be physically accessible to the owner of the data center.

Figure 2:
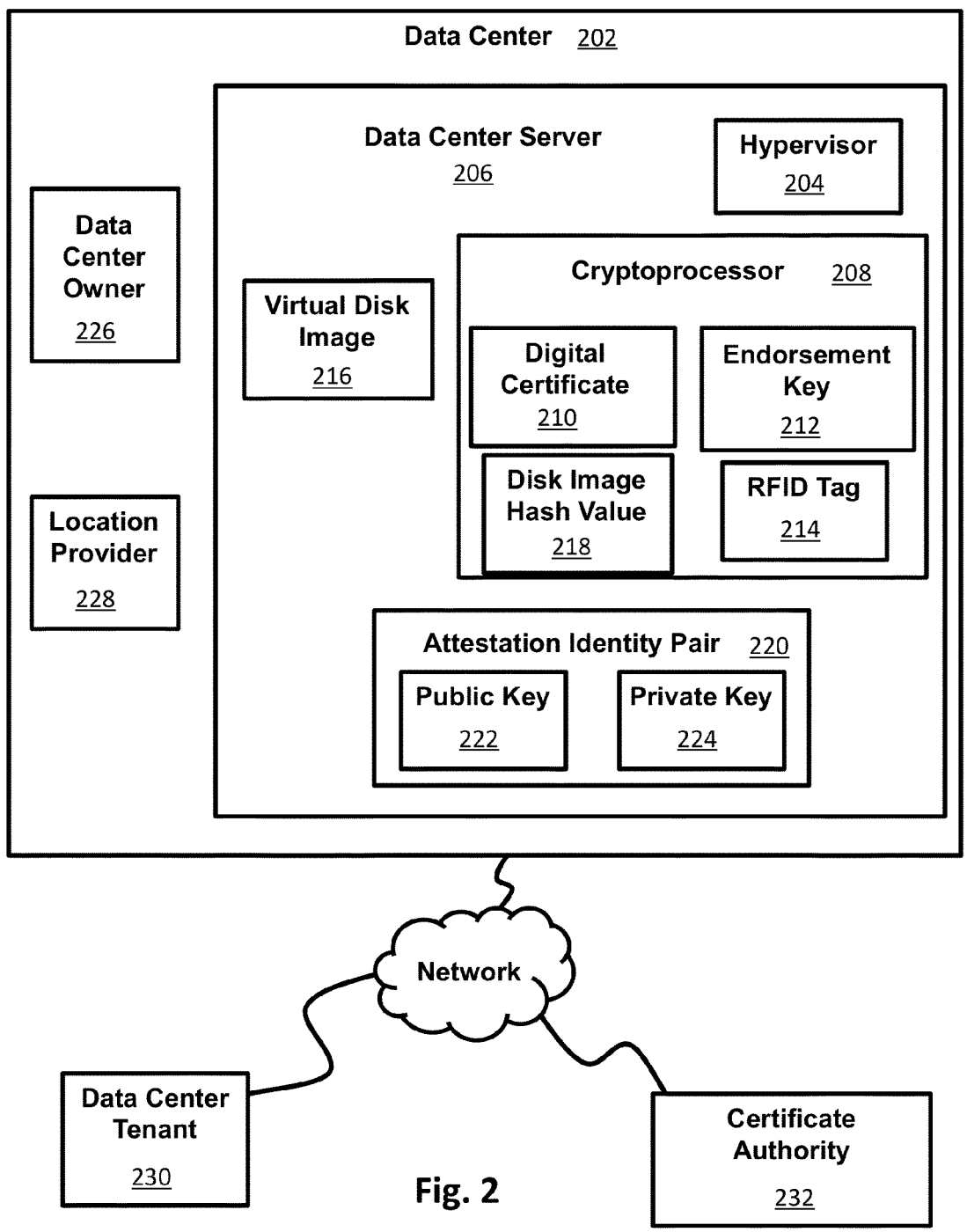
FIG. 2 shows a system to verify a geographic location of a virtual disk image executing at a data center server within a data center according to one embodiment of the present invention.

In another embodiment, by querying all RFID readers in the cloud using the EK of the TPM in the server that executes its workload, a client may discover the geographic location of the TPM and hence the server that the TPM belongs to. Thereby, the client may know the geographical location of the server executing its workload. To complete the solution, we need to specify a protocol using which a client may discover which server in the cloud executes its workload, and what that EK of the TPM of that server is. The protocol may be constructed using the attestation mechanism of the TPM. When the hypervisor executing on a server loads a workload for execution, it may compute a SHA-1 hash of the workload and store that hash value in one of the PCRs in the TPM. In order to determine which server executes its workload, a client may send an attestation request to the IP address of the server it believes is executing its workload. In response to this request, the server's TPM generates a new AIK pair, requests the Privacy CA to issues a certificate for the public half of the new AIK pair, and finally sends to the client the value in the PCR containing the hash of the client's workload along with the signature of this value computed using the newly generated AIK. In this manner, the client may obtain the AIK of the TPM in server that executes its workload. The hypervisor executing on the server may cache the certification request transmitted by the TPM to the Privacy CA and may transmit this request to the client. Since this request contains the TPM's EK, the client receives the EK of the TPM on the server that executes its workload. The client may then query all RFID readers in the cloud with the EK it learns to find the geographic location of the TPM on the server executing its workload. FIG. 2 shows a system to verify a geographic location of a virtual disk image executing at a data center server within a data center according to one embodiment of the present invention. The system includes a cryptoprocessor 208, a hypervisor 204 and a location provider 228. The cryptoprocessor is proximate the data center server 206 and includes an endorsement key 212 unique to the cryptoprocessor 208. In one embodiment, the cryptoprocessor is a TPM. A TPM is a tamperproof cryptographic chip based on specifications released by the Trusted Computing Group (TCG). Many commodity computers today have TPM chips built-in. The TPM provides two main functions on a computing platform: (1) the ability to attest to the software configuration of the computing platform to remote verifiers, and (2) the ability to protect the confidentiality and integrity of data on the platform, so that data is accessible only when the platform has a specific software configuration. The hypervisor 204 is configured to send a disk image hash value 218 of the virtual disk image 216, a digital certificate 210, and the endorsement key 212 to a data center tenant. The location provider 228 is located proximate the server 206. Furthermore, the location provider 228 is configured to send the geographic location of the cryptoprocessor 208 matching the endorsement key 212 to the data center tenant 230. In another embodiment the crypto coprocessor is the IBM PCI3 Cryptographic Coprocessor (IBM 4765 or earlier versions thereof) which provides a high-security, high-throughput cryptographic subsystem.

In one embodiment, the hypervisor 204 is configured to send a disk image hash value 218 of the virtual disk image 216 signed by a public key 222 of an attestation identity pair 220. In another embodiment, the location provider 228 may be configured to read a radio-frequency identification (RFID) tag 214. In another embodiment, each server in a cloud may be equipped with a tamperproof RFID chip that holds the public portion of the EK of the cryptoprocessor. This RFID chip could be attached to the motherboard or it can be integrated with other chips. Furthermore, the server may contain an antenna that allows communication with the RFID chip. The RFID chip may be associated with an individual server or multiple servers that share the same geographic location. Furthermore, the location provider 228 may be inaccessible to the owner 226 of the data center 202. In another embodiment, the location provider is a RFID reader placed in a room that cannot be accessed by the data center owner through a lock or other means of physical security. The RFID reader in this case may have an electronically steerable antenna with sufficient sensitivity and a narrow enough beamwidth to communicate with the RFID chips in each server in the data center. Furthermore, the RFID reader may have a network-attached computer that holds the database of all EKs read by the reader and the geographical location of the data center.

In another embodiment, the cryptoprocessor 208 may be configured to generate an attestation identity key pair 220. Furthermore, the hypervisor 204 may be configured to send the public key 222 of the attestation identity key pair 220 to the certificate authority 232.

In another embodiment, the certificate authority 232 may be configured to verify an authenticity of the public key 222 of the attestation identity key pair 220. Furthermore, the certificate authority 232 may be configured to generate the digital certificate 210 for the attestation identity key pair 220 upon verifying the authenticity of the public key 222.

In another embodiment, the certificate authority 232 may be configured to verify the endorsement key 212 and the public key 222 belong to the same cryptoprocessor 208.

Figure 3:
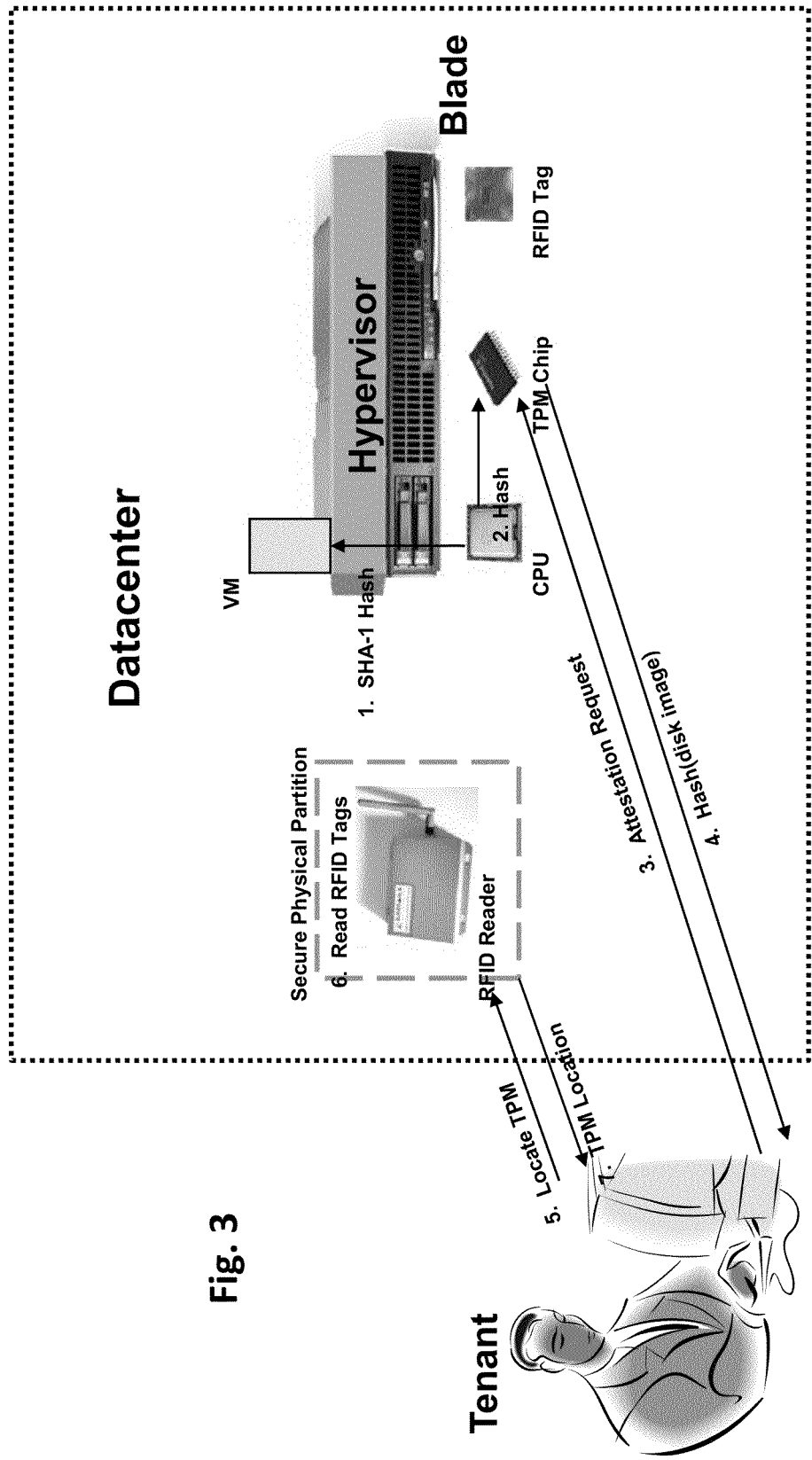
FIG. 3 shows another embodiment of the invention as a system where each server is equipped with a tamperproof RFID chip that holds a public key for each data center server in the datacenter.

FIG. 3 shows another embodiment of the invention as a system where each server is equipped with a tamperproof RFID chip that holds a public key for each data center server in the datacenter. The public key of the server is the public portion of the endorsement key (EK) of the trusted platform module (TPM) present in the server. The TPM chip may be tamperproof, and hence its EK may not be modified.

A long range RFID reader with an electronically steerable antenna may be placed within each data center in a physical location inaccessible to the cloud provider. The RFID reader knows the geographical location of the data center it is located in and can send this information to clients upon request. The RFID reader reads the EK of all servers in the data center and builds a key database containing the EKs of all servers hosted in the geographical location of the RFID reader.

When a workload is deployed on a server, the identity of that workload, the form of its cryptographic hash, is stored within the server's TPM. When the hypervisor executing on a server loads a client workload for execution, it computes a cryptographic hash of the virtual disk image and stores that hash value in one of the internal registers of the TPM.

In order to determine which server executes its workload, a client sends an attestation request to the IP address of the server it believes is executing its workload. In response to this request, the server's TPM generates a new RSA key pair called an attestation identity key (AIK), requests a certification authority called the Privacy CA to issue a certificate for the new AIK, and finally sends to the client the value in the PCR containing the hash of the client's workload along with the signature of this value computed using the newly generated AIK. In this manner, the client obtains the AIK of the TPM in server that executes its workload.

The hypervisor executing on the server caches the certification request transmitted by the TPM to the Privacy CA and transmits this request to the client. This request contains the TPM's EK, and thus the client receives the EK of the TPM on the server that executes its workload. The client can then query all RFID readers in the cloud with the EK it learns to find the geographic location of the TPM on the server executing its workload.

In one embodiment, the TPM has hardware registers called platform configuration registers (PCR) that can store cryptographic hashes of software loaded on the computing platform. Since the PCRs are present inside the TPM (which is tamperproof) the integrity of the hash values held in them is guaranteed. When a new software is loaded on the computing platform, the software performing the loading operation has the option of calculating the cryptographic hash of the software being loaded and storing this hash value in a PCR. For example, when the operating system kernel loads a new application, it can compute the SHA-1 hash of the application's binary image and store that hash value in one of the PCRs. The collection of hash values in all the PCRs then reflects the software configuration of the computing platform since these hashes denote what software was loaded for execution on the computing platform.

A remote verifier can request the TPM on a computing platform to provide an attestation of the software configuration of the computing platform. In response to such a request, the TPM sends the list of the hashes in its PCRs to the remote verifier. In order to guarantee that the integrity of the transmitted hashes the TPM signs the list of hashes with the private portion of a RSA key, known only to the TPM. The remote verifier has a certificate that enables it to authenticate the public portion of the TPM's signing key. Using this certificate the remote verifier can verify the signature on the list of hashes it receives, thereby verifying their integrity.

While having the TPM sign the list of hash values on every attestation request addresses the problem of integrity, it introduces a privacy problem. This problem can be seen by considering the following example. Let us assume websites request an attestation from each client computer that wishes to connect to them. Now if all attestation responses coming from a computer were signed with the same RSA key, it is possible for the different websites visited by the user of the computer to collude and determine that the same computer established connections with them. Clearly, this kind of tracking is undesirable.

One way to address this problem is to enable the TPM chip to sign the each attestations it generates with a unique RSA key. The TCG specification adopts this approach. When each attestation is signed using a new RSA key, called the attestation identity key (AIK) in TCG parlance, a new certificate has to be generated for the public portion for each AIK key. The TCG specification introduces a certificate authority (CA) called the Privacy CA for this purpose. Each time a TPM generates a new AIK, it sends the public portion of that AIK to the Privacy CA for certification. The Privacy CA issues a certificate for that AIK signed using the Privacy CA's private key. Remote verifiers have the public portion of the Privacy CA's signing key, using which they can verify the genuineness of the AIK certificates they receive as part of an attestation response.

However, there is a problem with the approach as explained above. How does the Privacy CA know that the AIK for which it is generating a certificate comes from a genuine TPM? After all, an attacker can generate a fake AIK and request for a certificate for the fake AIK from the Privacy CA. To address this problem, each TPM generates a unique RSA key pair called the endorsement key (EK) when it is manufactured. The public portion of a TPM's EK is then a unique cryptographic identifier for that TPM. The TPM manufacturer sends the public portion of each TPM's EK to the Privacy CA. The Privacy CA then has a database containing the EKs of all genuine TPMs. When a TPM requests the certificate for a newly generated AIK, it sends a signature of the AIK, generated using its EK, in the certification request to the Privacy CA. The Privacy CA only issues the certificate for the AIK if it has the public portion of the TPM's EK in its EK database and the signature on the AIK verifies because when these two conditions are satisfied, it is guaranteed that the AIK comes from a genuine TPM. Thus, the TPM can then use the new AIK and the corresponding certificate in attestation responses, thereby preserving the privacy of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to verify a geographic location of a virtual disk image executing at a data center server within a data center, the method comprising:
   receiving the virtual disk image from a data center tenant for execution at the data center;
   sending a disk image hash value of the virtual disk image signed by an endorsement key unique to a cryptoprocessor within the data center server to the data center tenant, a public half of the endorsement key, and a digital certificate certifying the public half of the endorsement key to the data center tenant, private half of the endorsement key is stored in the cryptoprocessor and is unique to the cryptoprocessor; and
   sending the geographic location of the cryptoprocessor matching the public half of the endorsement key to the data center tenant by a location provider within the data center.

2. The method of claim 1, wherein the disk image hash value is signed by a public key of an attestation identity key pair.

3. The method of claim 1, wherein sending the geographic location of the cryptoprocessor includes reading a radio-frequency identification (RFID) tag by the location provider, the RFID tag carried by the cryptoprocessor.

4. The method of claim 1, wherein the location provider is inaccessible to an owner of the data center.

5. The method of claim 1, further comprising receiving the virtual disk image from the data center tenant for execution at the data center.

6. The method of claim 1, further comprising computing the disk image hash value by a computer processor of the data center server.

7. The method of claim 1, further comprising:
   receiving by the hypervisor an attestation request from the data center tenant; and
   in response to the attestation request, sending the hash value of the virtual disk image by cryptoprocessor to the hypervisor.

8. The method of claim 1, further comprising:
   generating an attestation identity key pair by the cryptoprocessor; and
   sending a public key of the attestation identity key pair to a certificate authority via the hypervisor.

9. The method of claim 8, further comprising:
   verifying an authenticity of the public key of the attestation identity key pair by the certificate authority; and
   generating a digital certificate for the attestation identity key pair by the certificate authority upon verifying the authenticity of the public key.

10. The method of claim 9, wherein sending the disk image hash value includes sending the public key of the attestation identity key pair and the digital certificate for the attestation identity key pair to the data center tenant.

11. The method of claim 10, further comprising comparing, by the data center tenant, the public key of the attestation identity key pair to contents of the digital certificate for the attestation identity key.

12. The method of claim 11, further comprising verifying, by the certificate authority, that the endorsement key and the public key of the attestation identity key pair belong to the cryptoprocessor proximate the data center server.

* * * * *